Figure 1:
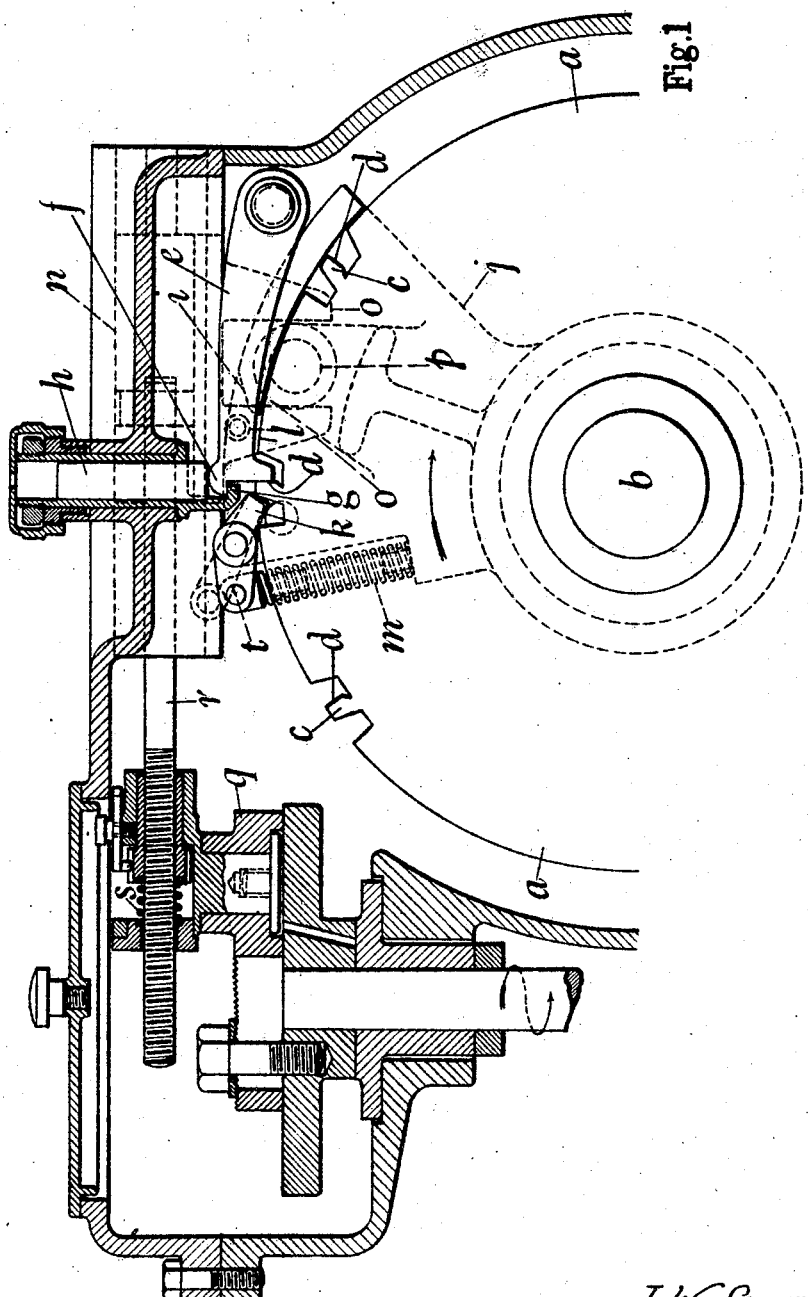

April 26, 1927.  
J. W. SNARRY  
1,626,564  
INDEXING MECHANISM FOR GRINDING AND OTHER MACHINES  
Filed Jan. 2, 1926  
2 Sheets-Sheet 1

J. W. Snarry  
INVENTOR  
By: Marks & Clerk  
Attys.

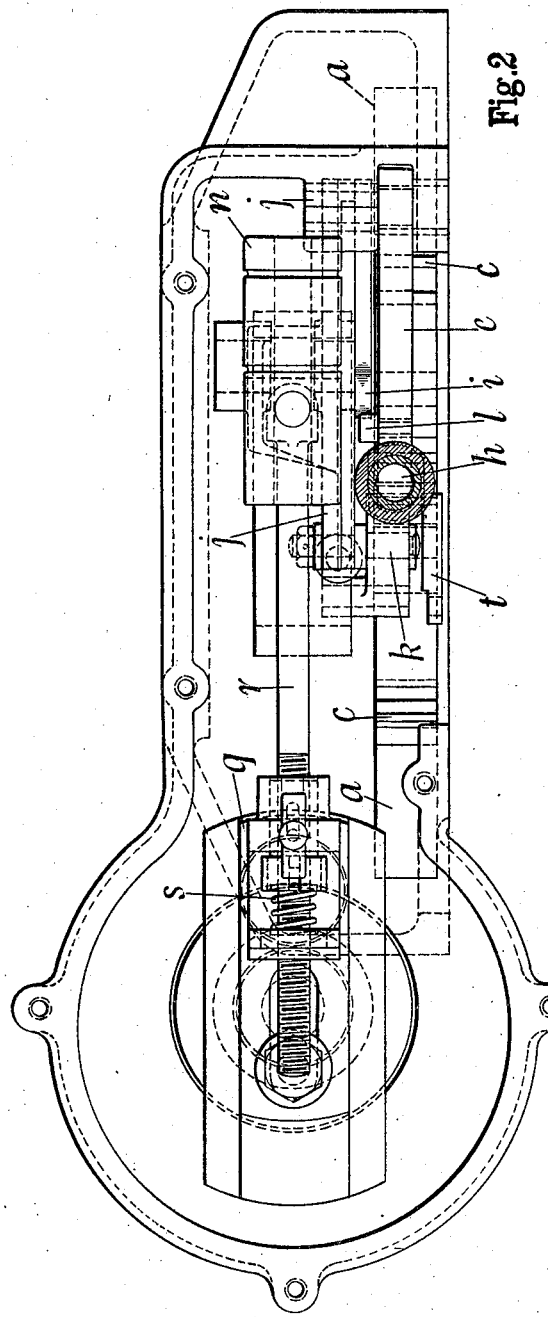

Patented Apr. 26, 1927.

1,626,564

UNITED STATES PATENT OFFICE.

JOHN WILDSMITH SNARRY, OF BIRMINGHAM, ENGLAND, ASSIGNOR TO THE GEAR GRINDING COMPANY LIMITED, OF BIRMINGHAM, ENGLAND.

INDEXING MECHANISM FOR GRINDING AND OTHER MACHINES.

Application filed January 2, 1926, Serial No. 79,046, and in Great Britain May 25, 1925.

This invention has for its object to provide improved indexing or dividing mechanism for use in grinding the teeth of gear wheels and the like, and for other similar purposes in which a high degree of accuracy is required.

The invention comprises the combination of an indexing or dividing plate mounted on a spindle and formed with a toothed periphery, one face in each tooth being disposed radially to the centre of the plate, a positioning pawl pivoted on a stationary pivot and formed with a flat end adapted to coact with the radial face of each of the teeth, a stop which limits the extent to which the said pawl can move into engagement with any tooth, an oscillatory arm carrying an actuating pawl which serves to move the plate from one position to the next, means for reciprocating the arm, said means including a spring which enables the actuating pawl to press the plate with definite pressure against the positioning pawl, and a cam for intermittently disconnecting the positioning pawl from the plate.

In the accompanying sheet of explanatory drawings:—

Figure 1 is a sectional side elevation and Figure 2 a plan showing a divided or indexing mechanism constructed in accordance with this invention.

In applying the invention as shown to machines for grinding the teeth of gear wheels and other like purposes, an indexing plate $a$ is secured to a spindle $b$ connected to the work piece. This plate has formed on its periphery a number of equally spaced teeth $c$, the distance between which corresponds to the angular movement to be imparted to the work piece between successive grinding operations. In the construction shown in the drawings the teeth $c$ are formed in the periphery of the plate $a$ by cutting a pair of notches at each of the proper positions on the plate, the tooth being formed by the portion between the notches. One face ($d$) of each tooth is made to coincide accurately with a radius through the centre of the plate. The opposite face may be slightly inclined.

Adjacent to the plate is pivoted on a fixed pivot a positioning pawl $e$ the free end of which is flat and is adapted to co-act with and serve as an abutment for the radial face of each of the teeth. To ensure that the flat end of the positioning pawl shall always occupy a truly radial position when in action a projecting shoulder $f$ on the free end of the pawl is arranged to rest on an adjustable stop $g$. The stop is so adjusted that when the shoulder of the pawl rests on it the end face of the pawl coincides accurately with a radius through the centre of the indexing plate. The pawl is pressed on the stop by a weight or plunger $h$ acting on the pawl; if desired this plunger may be loaded by a spring.

For lifting the pawl out of engagement with the indexing plate an oscillatory cam $i$ is employed, the cam being arranged in combination with an oscillatory arm $j$ which carries the plate actuating pawl $k$. This pawl is pivoted on the arm in such a manner that in one direction of motion it passes idly over the periphery of the indexing plate, whilst in the other direction of motion it engages a tooth (under the action of a spring $m$) and moves the plate through the required angular distance. During the idle movement, the cam by acting on a peg or roller $l$ lifts the positioning pawl out of action. The pawl is allowed by the cam to re-engage the plate towards the end of the next movement of the plate. A locking pawl (as indicated by dotted lines at $t$) may be employed to prevent movement of the plate during the idle motion of the actuating pawl.

Oscillation of the arm is preferably effected by a reciprocating slide $n$ adapted to engage the arm through a fork $o$ and roller $p$ or other suitable device. The slide is actuated from a crank $q$, and on the connecting piece $r$ between the slide and crank a compression spring $s$ is arranged. The motion is imparted from the crank to the slide through the spring. At the end of each operative movement, the spring is compressed to a predetermined amount, and the spring causes the actuating pawl to press the indexing plate firmly against the positioning pawl.

By this invention I am able to attain a high degree of accuracy in a very simple manner.

Having thus described my invention what I claim as new and desire to secure by Letters Patent is:—

1. In indexing or dividing mechanism for grinding and other machines, the combination of an indexing or dividing plate formed with a toothed periphery, one face in each tooth being disposed radially to the centre of the plate, a spindle on which the plate is mounted, a positioning pawl formed with a flat end adapted to coact with the radial face of each of the teeth, a stationary pivot for the positioning pawl, a stop which limits the extent to which the positioning pawl can move into engagement with any tooth, an oscillatory arm carrying an actuating pawl adapted to move the plate from one position to the next, means for reciprocating the arm, said means including a spring which enables the actuating pawl to press the plate with definite pressure against the positioning pawl, and a cam for intermittently disconnecting the positioning pawl from the plate substantially as described.

2. In indexing or dividing mechanism for grinding and other machines, the combination of an indexing or dividing plate formed with a toothed periphery, one face of each tooth being disposed radially to the centre of the plate, a spindle on which the plate is mounted, a positioning pawl, a stationary pivot for said pawl, the pawl being provided with a flat end adapted to coact with the radial face of each of the teeth on the plate, a stop adapted to limit the extent to which the said pawl can move into engagement with any tooth, an oscillatory arm, an actuating pawl carried on said arm and adapted to move the plate from one position to the next, a reciprocatory member for oscillating the arm, a crank for actuating the reciprocatory member, a spring in conjunction with the crank and reciprocatory member whereby the actuating pawl can press the plate with definite pressure against the positioning pawl, and a cam adapted to intermittently disconnect the positioning pawl from the plate, substantially as described.

3. In indexing or dividing mechanism as claimed in claim 1, the combination with the positioning pawl, of means for pressing it into contact with the stop, substantially as described.

In testimony whereof I have signed my name to this specification.

JOHN WILDSMITH SNARRY.